(12) United States Patent
Si

(10) Patent No.: US 6,296,883 B1
(45) Date of Patent: *Oct. 2, 2001

(54) USE OF LACCASE IN BAKING

(75) Inventor: Joan Qi Si, Laufen (CH)

(73) Assignee: Novozymes A/S, Bagsvaerd (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/545,828

(22) PCT Filed: Jun. 13, 1994

(86) PCT No.: PCT/DK94/00232

§ 371 Date: Nov. 8, 1995

§ 102(e) Date: Nov. 8, 1995

(87) PCT Pub. No.: WO94/28728

PCT Pub. Date: Dec. 22, 1994

(30) Foreign Application Priority Data

Jun. 11, 1993 (DK) .................................... 0691/93

(51) Int. Cl.$^7$ ...................................... A21D 2/00

(52) U.S. Cl. ................ 426/18; 426/19; 426/20; 426/549

(58) Field of Search ................ 426/18, 19, 20, 426/27, 48, 49, 52, 549

(56) References Cited

U.S. PATENT DOCUMENTS 4,212,947 * 7/1980 Torev .............................. 426/656 X

OTHER PUBLICATIONS

Kyow, 79–28599B [15] WPIDS, abstracting JP 54028856 A.*
Wood, D.A., "Production, Purification and Properties of Extracellular Laccase of Agaricus bisporus", Journal of General Microbiology (1980) 117, 327–338.
Kurtz, Myra Berman et al, "Purification and Characterization of the Conidial Laccese of Aspergillus nidulans", Journal of Bacteriology (1982), 1338–1345.
Gunata, Yusuf, "Subtrates and Aromatic Carboxylic Acid Inhibitors Of Grape Phenol Oxidases", Phytochemistry, vol. 26, No. 6, pp. 1573–1575, 1987.
Greiger, J.P., "Laccases of Rigidoporus lignosus and Phellinus noxius", The Humana Press, 1986.
De Vries et al, "Formation of an Extracellular Laccase by a Schizophyllum commune Dikaryon", Journal of General Microbiology (1996), 132, 2817–2826.
Mayer, Alfred, "Polyphenol Oxidases In Plants—Recent Progress", Phytochemistry, vol. 26, No. 1, pp. 11–20, (1987).

Ishigami, Tadashi et al, "Characterization of Ployphenol Oxidase From Chaetomium Thermophile, A Thermophilic Fungus", J. Gen. Appl. Microbiology, 34, 401–407 (1988).
Rossi, M. et al, "Effects of Laccse and Other Enzymes On Barley Wort Phenolics As Possible Treatment To Prevent Haze In Beer", Bulletin de Liaison No. 14, (1988).
Givaudan, Alain et al, "Ployphenol oxidase in Azospirillum lipoferum isolated from rice rhizophere: Evidence for laccase activity in non–motile strains of Azospirillum lipoferum", FEMS Microbiology Letters 108 (1993) 205–210.
Nomenclature for EC number 1.10.3.1, Enzyme Handbook (1994).
Nomenclature for EC number 1.10.3.2, Enzyme Handbook (1994).
Laccase Powder, Document from Shin Nihon Chemical Co., Ltd, Japan, no date.
Oxidoreductases—"Enzymes that reduce or oxidize" http://www/novo.dk/enzymes/attachments/oxidoreductases.htm, no date.
Kuninori, T. et al, "Effect of Mushroom Extract On The Physical Properties of Dough", American Association of Cereal Chemists, Inc. (1976), Ceral Chemistry 53(3) : 420–428.
Nishiyama, Junko, et al., "Effect Mushroom Extract on Dough–Reaction of SH –Gluten with Mushroom–oxidized Phenols", J. Ferment. Technol., vol. 57, No. 5, p. 387–394, 1979.
Maningat, J.I. et al, "Short–Time Breadmaking Systems Effect on Oxidation", Journal of Food Science—Vol. 53, No. 2, 1988.
Brenna, O. et al, "Action of Peroxidase and Polyphenoloxidase On Soluble Pentosana From Wheat Flour and Model Doughs", Bulletin de Liaison No 14 du Groupe Polyphenols, 1988.
Neukom, Hans et al., "Oxidative Gelation of Wheat Flour Pentosans: A New Way of Cross–Limking Polymers", pp. 374–378/Jul. 1978, vol. 23, No. 7.
Hoseney, R.C., "A Mechanism for the Oxidative Gelation of Wheat Flour Water–Soluble Pentosana", American Association of Cereal Chemists (1981), vol. 58, No. 5.
Rogalski, J. et al., "Affinity Chromatography as a Rapid and convenient Method for Purification of Fungal Laccases", Biotechnology and Bioengineering, vol. 37, pp. 770–777 (1991).
Saloheimo, Markku et al., "Heterologous Production of a Ligninolytic Enzyme: Expression of The Phlebia Radiata Laccase Gene In Trichoderma Reesei", Biotechnology, vol. 9, Oct. 1991.

(List continued on next page.)

Primary Examiner—Leslie Wong
(74) Attorney, Agent, or Firm—Elias J. Lambiris; Jason I. Garbell

(57) ABSTRACT

A dough- or bread-improving composition comprising laccase as well as the use of the composition in the preparation of dough and baked products.

15 Claims, No Drawings

OTHER PUBLICATIONS

Rehman, Ata Ur et al., "Purification of laccase I from Armillaria mellea", Journal of General Microbiology (1992), 138, 1251–1257.

Kuninori et al., "Effect of Mushroom Extract on The Physical Properties of Dough", 1976 American of Cereal Chemists, Inc., pp. 420–428.

* cited by examiner

USE OF LACCASE IN BAKING

CROSS-REFERENCE TO RELATED APPLICATIONS

This application is a National stage filing of PCT/DK94/00232 filed Jun. 13, 1994, which is incorporated herein by reference.

FIELD OF THE INVENTION

The present invention relates to a bread-improving or dough-improving composition comprising an enzyme as well as to a method of preparing a dough and/or a baked product by use of the composition.

BACKGROUND OF THE INVENTION

In the bread-making process it is known to add bread-improving and/or dough-improving additives to the bread dough, the action of which, inter alia, results in improved texture, volume, flavour and freshness of the bread as well as improved machinability of the dough.

In recent years a number of enzymes have been used as dough and/or bread improving agents, in particular enzymes which act on components present in large amounts in the dough. Examples of such enzymes are found within the groups of amylases, proteases and cellulases, including pentosanases.

Laccase (EC 1.10.3.2) is an enzyme catalyzing the conversion of benzenediols into benzosemiquinones according to the following formula:

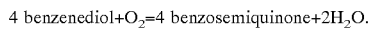

4 benzenediol+$O_2$=4 benzosemiquinone+$2H_2O$.

The enzyme has been used in the paper and pulp industry as well as for diagnosis, but the use of the enzyme in baking has never been suggested.

It is the object of the present invention to improve the properties of dough and/or baked products by the use of a laccase enzyme.

BRIEF DISCLOSURE OF THE INVENTION

Accordingly, in a first aspect the present invention relates to a bread-improving and/or a dough-improving composition comprising a laccase enzyme.

In the present context the terms "bread-improving composition" and "dough-improving composition" are intended to indicate compositions which, in addition to the enzyme component, may comprise other substances conventionally used in baking to improve the properties of dough and/or baked products. Examples of such components are given below.

Without being limited to any theory it is presently contemplated that when a laccase enzyme is added to dough used for producing baked products, it may exert an oxidizing effect on dough constituents and thereby serve to, e.g., improve the strength of gluten structures in dough and/or baked products. Further improved properties may also be shown to be obtained.

In the present context the term "improved properties" is intended to indicate any property which may be improved by the action of a laccase enzyme. In particular, the use of laccase results in an increased volume and an improved crumb structure and softness of the baked product, as well as an increased strength, stability and reduced stickiness and thereby improved machinability of the dough. The effect on the dough has been found to be particularly good when a poor quality flour has been used. The improved machinability is of particular importance in connection with dough which is to be processed industrially.

The improved properties are evaluated by comparison with dough and/or baked products prepared without addition of laccase in accordance with the present invention.

In a second aspect, the present invention relates to a method of preparing a dough and/or a baked product prepared from the dough comprising adding a laccase enzyme, optionally present in a bread-improving or dough-improving composition, to the dough and/or to any ingredient of the dough and/or to any mixture of the dough ingredients.

In further aspects, the present invention relates to a dough and a baked product, respectively, produced by the present method as well as to a pre-mix comprising a laccase enzyme. In the present context, the term "pre-mix" is intended to be understood in it's conventional meaning, i.e. as a mix of baking agents, normally including flour, which may be used not only in industrial bread-baking plants/facilities, but also in retail bakeries.

In a final aspect, the present invention relates to the use of a laccase enzyme for the preparation of dough and/or baked products.

DETAILED DISCLOSURE OF THE INVENTION

While the laccase enzyme of the dough- and/or bread-improving composition of the invention may be of any origin, including plant origin, it is presently preferred that the laccase enzyme is of microbial origin. Thus, a microbial enzyme is normally easier to produce on a large scale than a non-microbial enzyme of, e.g., plant origin. Furthermore, the microbial enzyme may normally be obtained in a higher purity than enzymes of other origins, resulting in a lower amount of undesirable enzymatic side-activities.

The microbial laccase enzyme may be derived from bacteria or fungi (including filamentous fungi and yeasts) and suitable examples include a laccase derivable from a strain of Aspergillus, Neurospora, e.g. *N. crassa* Podospora, Botrytis, Collybia, Fomes, Lentinus, Lentinus, Pleurotus, Trametes, Rhizoctonia, e.g. *R. solani,* Coprinus, e.g. *C. plicatilis,* Psatyrella, Myceliophtera, e.g. *M. thermophila,* Schytalidium, Polyporus, e.g. *P. pinsitus,* Phlebia, e.g. *P. radita* (WO 92/01046), or Coriolus, e.g. *C. hirsutus* (JP 2-238885).

The laccase may be obtained from the microorganism in question by use of any suitable technique. For instance, a laccase preparation may be obtained by fermentation of a microorganism and subsequent isolation of a laccase containing preparation from the resulting fermented broth or microorganism by methods known in the art, but more preferably by use of recombinant DNA techniques as known in the art. Such method normally comprises cultivation of a host cell transformed with a recombinant DNA vector capable of expressing and carrying a DNA sequence encoding the laccase in question, in a culture medium under conditions permitting the expression of the enzyme and recovering the enzyme from the culture.

The DNA sequence may be of genomic, CDNA or synthetic origin or any mixture of these, and may be isolated or synthesized in accordance with methods known in the art.

The laccase enzyme to be included in the bread-improving and/or dough-improving composition of the invention may be in any form suited for the use in question, e.g. in the form of a dry powder or granulate, in particular a non-dusting granulate, a liquid, in particular a stabilized liquid, or a protected enzyme. Granulates may be produced, e.g. as disclosed in U.S. Pat. No. 4,106,991 and U.S. Pat. No. 4,661,452 (both to Novo Industri A/S), and may optionally be coated by methods known in the art. Liquid enzyme preparations may, for instance, be stabilized by adding nutritionally acceptable stabilizers such as a sugar, a sugar alcohol or another polyol, lactic acid or another organic acid according to established methods. Protected enzymes may be prepared according to the method disclosed in EP 238, 216.

Normally, for inclusion in pre-mixes or flour it is advantageous that the laccase enzyme preparation is in the form of a dry product, e.g. a non-dusting granulate, whereas for inclusion together with a liquid it is advantageously in a liquid form.

The bread- and/or dough-improving compostion of the invention may further comprise another enzyme. Examples of other enzymes are a cellulase, a hemicellulase, a pentosanase (useful for the partial hydrolysis of pentosans which increases the extensibility of the dough), a glucose oxidase (useful for strengthening the dough), a lipase (useful for the modification of lipids present in the dough or dough constituents so as to soften the dough), a peroxidase (useful for improving the dough consistency), a protease (useful for gluten weakening, in particular when using hard wheat flour), a peptidase and/or an amylase, e.g. $\alpha$-amylase (useful for providing sugars fermentable by yeast).

The other enzyme components are preferably of microbial origin and may be obtained by conventional techniques used in the art as mentioned above. In a particular embodiment, the other enzyme component(s) may be produced from the same source as the laccase in question and recovered together with the laccase.

In addition or in an alternative to other enzyme components, the dough-improving and/or bread-improving composition may comprise a conventionally used baking agent, e.g. one or more of the following constituents:

A milk powder (providing crust colour), gluten (to improve the gas retention power of weak flours), an emulsifier (to improve dough extensibility and to some extent the consistency of the resulting bread), granulated fat (for dough softening and consistency of bread), an oxidant (added to strengthen the gluten structure; e.g. ascorbic acid, potassium bromate, potassium iodate or ammonium persulfate), an amino acid (e.g. cysteine), a sugar, and salt (e.g. sodium chloride, calcium acetate, sodium sulfate or calcium sulfate serving to make the dough firmer), flour or starch.

Examples of suitable emulsifiers are mono- or diglycerides, diacetyl tartaric acid esters of mono- or diglycerides, sugar esters of fatty acids, polyglycerol esters of fatty acids, lactic acid esters of monoglycerides, acetic acid esters of monoglycerides, polyoxyethylene stearates, phospholipids and lecithin.

The bread-improving and/or dough improving composition of the invention is typically included in the dough in an amount corresponding to 0.1–5%, such as 0.1–3% of the amount of flour to be added and typically comprises 0.5–30, 000 Laccase Units per gramme.

In accordance with the method of the invention, in which laccase is used for the preparation of dough and/or baked products, the enzyme may be added as such to the mixture from which the dough is made. Alternatively, the laccase enzyme may be added as a constituent of a dough-improving and/or a bread-improving composition as described above.

The dosage of the laccase enzyme to be used in the method of the present invention should be adapted to the nature and composition of the dough in question. Normally, the enzyme preparation is added in an amount corresponding to 5–100,000 Laccase Units. The Laccase Units (LACU) may be determined by the assay described below in the Materials and Methods section.

It is preferred that the laccase enzyme is added in an amount corresponding to 50–20,000 LACU, such as 50–30, 000 LACU, and in particular 100–1500 LACU per kg of flour.

When one or more additional enzyme activities are to be added in accordance with the method of the invention, these activities may be added separately or together with the laccase preparation, optionally as constituent(s) of the bread-improving and/or dough-improving composition of the invention.

The other enzyme activities may be any of the above described enzymes and may be dosed in accordance with established baking practice.

As mentioned above the laccase enzyme is added to any mixture of dough ingredients, to the dough, or to any of the ingredients to be included in the dough, in other words the laccase enzyme may be added in any step of the dough preparation and may be added in one, two or more steps, where appropriate. However, the enzyme should not be added together with any strong chemical or under conditions where the enzyme is inactivated.

The handling of the dough and/or baking is performed in any suitable manner for the dough and/or baked product in question, typically including the steps of kneading the dough, subjecting the dough to one or more proofing treatments, and baking the product under suitable conditions, i.e. at a suitable temperature and for a sufficient period of time. For instance, the dough may be prepared by using a normal straight dough process, a sour dough process, an overnight dough method, a low-temperature and long-time fermentation method, a frozen dough method, the Chorleywood Bread process, and the Sponge and Dough process.

The dough and/or baked product prepared by the method of the invention are normally based on wheat meal or flour, optionally in combination with other types of meal or flour such as corn flour, rye meal, rye flour, oat flour or meal, soy flour, sorghum meal or flour, or potato meal or flour.

However, it is contemplated that the method of the present invention will function equally well in the preparation of dough and baked products primarily based on other meals or flours, such as corn meal or flour, rye meal or flour, or any other types such as the types of meal or flour mentioned above.

In the present context the term "baked product" is intended to include any product prepared from dough, either of a soft or a crisp character. Examples of baked products, whether of a white, light or dark type, which may advantageously be produced by the present invention are bread (in particular white, wholemeal or rye bread), typically in the form of loaves or rolls, French baguette-type bread, pita bread, tacos, cakes, pancakes, biscuits, crisp bread and the like.

The dough of the invention may be of any of the types discussed above, and may be fresh or frozen.

From the above disclosure it will be apparent that the dough of the invention is normally a leavened dough or a dough to be subjected to leavening. The dough may be leavened in various ways such as by adding sodium bicarbonate or the like or by adding a leaven (fermenting dough), but it is preferred to leaven the dough by adding a suitable yeast culture such as a culture of *Saccharomyces cerevisiae* (baker's yeast). Any of the commercially available *S. cerevisiae* strains may be employed.

As mentioned above, the present invention further relates to a pre-mix, e.g. in the form of a flour composition, for dough and or baked products made from dough, which pre-mix comprises a laccase enzyme. The pre-mix may be prepared by mixing a laccase preparation or a bread-improving and/or dough-improving composition of the invention comprising laccase with a suitable carrier such as flour, starch, a sugar or a salt. The pre-mix may contain other dough-improving and/or bread-improving additives, e.g. any of the additives, including enzymes, mentioned above.

In a further aspect the invention relates to the use of a laccase enzyme for improving properties of a dough and/or a baked product made therefrom. The type of laccase as well as the manner in which it may be used is described in detail above.

In a final aspect the invention relates to the use of laccase for the preparation of pasta dough, preferably prepared from durum flour or a flour of comparable quality. The dough may be prepared by use of conventional techniques and the laccase used in a similar dosage as that described above. The laccase is preferably of microbial origin, e.g. as disclosed herein. It is contemplated that when used in the preparation of pasta the laccase results in a strengthening of the gluten structure and thus a reduction in the dough stickiness and an increased dough strength.

MATERIALS AND METHODS

Enzymes

Laccase: A *Rhizoctonia solani* laccase produced by the *Rhizoctonia solani* strain RS22 deposited with the International Mycological Institute, Genetic Resource Reference Collection, located at Bakeham Lane, Egham Surrey TW20 9TY on Sep. 3, 1993 under the terms of the Budapest Treaty and given the accession number IMI CC 358730. The *Rhizoctonia solani* laccase is further described in co-pending application (U.S. Ser. No. 08/172,331), the contents of which is hereby incorporated by reference.

Xylanase: A xylanase produced by the *Humicola insolens* strain DSM 1800 available from the Deutsche Sammlung von Mikroorganismen und Zellkulturen GmbH and further described in EP 507 723.

Pentosanase: Pentopan® available from Novo Nordisk A/S.

Fungamyl: A commercial fungal α-amylase preparation available from Novo Nordisk A/S.

Determination of Laccase Activity

Laccase activity is determined by incubating a laccase containing sample with syringaldazin (19 μM, Sigma No. S 7896) under aerobic conditions (30° C., 1 min., pH 5.5), whereby the syringaldazin is oxidized to tetramethoxy azo bis-methylene quinone. The absorbance is measured at 530 nm after 15 and 75 seconds and the difference between the measured values is proportional with the laccase units per ml or grammes of sample.

1 Laccase Unit (LACU) is the amount of enzyme which, under the prescribed reaction conditions, converts 1 μM syringaldazin per minute.

FAU—Fungal Alpha-Amylase Units

1 FA-unit (FAU) is the amount of enzyme which at 37° C. and pH 4.7 breaks down 5260 mg of solid starch per hour.

FXU—xylanase Activity

The endo-xylanase activity is determined by an assay, in which the xylanase sample is incubated with a remazol-xylan substrate (4-O-methyl-D-glucurono-D-xylan dyed with Remazol Brilliant Blue R, Fluka), pH 6.0. The incubation is performed at 50° C. for 30 min. The background of non-degraded dyed substrate is precipitated by ethanol. The remaining blue colour in the supernatant is determined spectrophotometrically at 585 nm and is proportional to the endoxylanase activity.

The endoxylanase activity of the sample is determined relatively to an enzyme standard.

Preparation of Bread

Procedure

1. Dough mixing (Spiral mixer)
   3 min. at 700 RPM
   8 min. at 1400 RPM the mixing time was determined and adjusted by a skilled baker so as to obtain an optimum dough consistence under the testing conditions used.

2. 1st proof: 30° C.–80% RH, 20 min.
3. Scaling and shaping;
4. Final proof: 32° C.–80% RH, 40 min.;
5. Baking: 225° C., 20 min. for rolls and 30 min for loaf.

Evaluation of Dough and Baked Products

Dough and baked products described in the examples were evaluated as follows:

Loaf specific volume: the mean value of 4 loaves volume are measured using the traditional rape seed method. The specific volume is calculated as volume ml per g bread. The specific volume of the control (without enzyme) is defined as 100. The relative specific volume index is calculated as:

$$\text{Specific vol. index} = \frac{\text{specific vol. of 4 loaves}}{\text{spec. vol. of 4 control loaves}} * 100$$

The dough stickiness and crumb structure are evaluated visually according to the following scale:

| Dough stickiness: | almost liquid | 1 |
|---|---|---|
| | too sticky | 2 |
| | sticky | 3 |
| | normal | 4 |
| | dry | 5 |
| Crumb structure: | very poor | 1 |
| | poor | 2 |
| | non-uniform | 3 |
| | uniform/good | 4 |
| | very good | 5 |

Shock test: After the second proof a pan containing the dough is dropped from a height of 20 cm. The dough is baked and the volume of the resulting bread is determined.

EXAMPLES

Example 1

| Wheat flour pan bread | |
|---|---|
| Recipe | |
| Wheat flour | 100% |
| Yeast | 4% |
| Salt | 1.5% |

-continued

Wheat flour pan bread

Recipe

| | |
|---|---|
| Sugar | 1.5% |
| Water | 59% |

Flour type: Pastetli-Intermid without ascorbic acid (Intermill, Schweiz).

TABLE 1

| | | | |
|---|---|---|---|
| Laccase LACU/kg flour | 0 | 600 | 1000 |
| Specific volume index After shock | 100 | 100 | 107 |
| Specific volume index | 100 | 109 | 106 |
| Crust crispy | normal | improved | improved |

Laccase has a significant effect on improving the baking quality of flour without oxidant. The dough stability is improved by the addition of laccase, because the bread with laccase regain more volume than the control after the dough have been shocked.

Example 2

Whole meal bread

Recipe

| | |
|---|---|
| Wholemeal flour (Intermill-Graham) | 100% |
| Yeast | 4% |
| Salt | 2% |
| Malt | 1% |
| Gluten | 3% |
| Water | 75% |

TABLE 2

| | | | | | | |
|---|---|---|---|---|---|---|
| Laccase LACU/kg flour | 0 | 500 | 1000 | 1000 | 1000 | 0 |
| Pentopan g/kg flour | 0 | | | 0.15 | | |
| Fungamyl FAU/kg flour | | | | | 15 | 15 |
| Specific volume index | 100 | 101 | 101 | 105 | 108 | 110 |
| after shock, Specific volume index | 100 | 105 | 108 | 106 | 109 | 105 |

For the whole meal bread, addition of laccase reduces dough stickiness during dough handling. Furthermore, the dough becomes more stable (as shown by the fact that bread treated with laccase can regain more volume compared to the control after shock test).

Example 3

Bread Prepared with Wheat Flour Containing Ascorbic Acid

The wheat flour used was Manitaba flour, a Danish baking flour with ascorbic acid (avaible from Valsemøllerne A/S, Denmark).

TABLE 3

| | | | | | | | | | |
|---|---|---|---|---|---|---|---|---|---|
| Laccase | LACU/kg fl. | 0 | 1000 | 1000 | | 1000 | | 1000 | |
| Pentopan | g/kg fl. | 0 | | 0.15 | 0.15 | | | | |
| Xylanase | FXU/kg fl. | 0 | | | | 50 | 50 | | |
| Fungamyl | FAU/kg fl. | 0 | | | | | | 30 | 30 |
| Dough stickiness | | 4 | 4.5 | 4 | 3.5 | 4 | 3.5 | 4.5 | 3 |
| Sp. vol-.ind | | 100 | 104 | 116 | 116 | 117 | 117 | 112 | 111 |
| Crumb structure | | 3 | 4 | 4 | 4 | 4 | 4 | 4 | 3.5 |
| Dough firmness | | 4 | 4 | 4 | 3.5 | 4.5 | 3.5 | 4 | 3.5 |

Addition of laccase reduces the dough stickiness. Enzymes such as pentosanase/xylanase and fungal amylase can cause dough stickiness and dough softness. When combining laccase with one of these enzymes the dough became normal. This is desirable for baking processes in which dough stickiness is not acceptable.

Example 4

Flour

Whole wheat flour (Intermill, Schweiz)

Prima flour (Havnemøllerne A/St Denmark),

Reform flour (Havnemøllerne A/S, Denmark)

Manitoba flour (Valsemøllerne A/S, Denmark),

Pasteli-flour (Intermill, Schweiz).

| Procedure | |
|---|---|
| Flour | 300 g |
| NaCl | 6 g |

Laccase was used in the amount indicated in the tables.

Water was added in an amount sufficient to give a consistency of 500+/−20 FU in Brabender Farinograph.

Extensograph measurements were conducted 45, 90, and 135 min, respectively, of dough resting. The extensograph used was from Branbender and Duisburg, Germany, and was used as recommended by the manufacturer.

The results obtained appear from the following tables. It is evident that the use of laccase increases the dough resistance to extension of dough prepared from different types of flour. The resistance to extension increases with increasing dosages of laccase.

TABLE 4

WHOLE WHEAT FLOUR

| LACCASE (U/kg FLOUR) | PROVING TIME (min) | ENERGY (cm2) | RESISTANCE to EXTENSION (BU) | EXTENSIBILITY (mm) | MAXIMUM (BU) |
|---|---|---|---|---|---|
| 0 | 45 | 56 | 273 | 135 | 273 |
| 600 |  | 64 | 333 | 125 | 338 |
| 1000 |  | 64 | 343 | 121 | 348 |
| 1500 |  | 66 | 371 | 117 | 375 |
| 0 | 90 | 61 | 361 | 114 | 363 |
| 600 |  | 74 | 483 | 106 | 487 |
| 1000 |  | 76 | 502 | 107 | 516 |
| 1500 |  | 75 | 534 | 99 | 543 |
| 0 | 135 | 65 | 393 | 115 | 397 |
| 600 |  | 77 | 543 | 101 | 554 |
| 1000 |  | 79 | 572 | 99 | 581 |
| 1500 |  | 73 | 569 | 94 | 573 |

TABLE 5

REFORM FLOUR
Proving Time: 45 min

| LACCASE (U/kg FLOUR) | ENERGY (cm2) | RESISTANCE to EXTENSION (BU) | EXTENSIBILITY (mm) | MAXIMUM (BU) |
|---|---|---|---|---|
| 0 | 110 | 494 | 131 | 609 |
| 600 | 111 | 508 | 128 | 650 |
| 1000 | 120 | 562 | 127 | 704 |
| 1500 | 112 | 564 | 122 | 669 |

TABLE 6

"PASTETLI" FLOUR

| LACCASE (U/kg FLOUR) | PROVING TIME (min) | ENERGY (cm2) | RESISTANCE to EXTENSION (BU) | EXTENSIBILITY (mm) | MAXIMUM (BU) |
|---|---|---|---|---|---|
| 0 | 45 | 86 | 342 | 145 | 403 |
| 600 |  | 101 | 385 | 149 | 480 |
| 1000 |  | 101 | 394 | 146 | 492 |
| 1500 |  | 106 | 473 | 133 | 573 |
| 0 | 90 | 103 | 437 | 144 | 521 |
| 600 |  | 114 | 535 | 131 | 631 |
| 1000 |  | 120 | 617 | 125 | 705 |
| 1500 |  | 124 | 758 | 112 | 842 |
| 0 | 135 | 109 | 499 | 134 | 589 |
| 600 |  | 116 | 636 | 118 | 730 |
| 1000 |  | 115 | 707 | 111 | 787 |
| 1500 |  | 121 | 842 | 102 | 906 |

TABLE 7

MANITOBA
Proving Time: 45 min

| LACCASE (U/kg FLOUR) | ENERGY (cm2) | RESISTANCE to EXTENSION (BU) | EXTENSIBILITY (mm) | MAXIMUM (BU) |
|---|---|---|---|---|
| 0 | 119 | 421 | 149 | 597 |
| 600 | 133 | 473 | 148 | 681 |
| 1000 | 135 | 519 | 144 | 708 |
| 1500 | 135 | 567 | 136 | 748 |

TABLE 8

PRIMA FLOUR
Proving Time: 45 min

| LACCASE (U/kg FLOUR) | ENERGY (cm2) | RESISTANCE to EXTENSION (BU) | EXTENSIBILITY (mm) | MAXIMUM (BU) |
|---|---|---|---|---|
| 0 | 121 | 496 | 141 | 629 |
| 600 | 115 | 528 | 127 | 678 |
| 1000 | 126 | 565 | 132 | 711 |

What is claimed is:

1. A dough composition suitable for baking, comprising flour, water, and a laccase enzyme in an amount effective to increase resistance of the dough composition to extension.

2. The dough composition of claim 1, wherein the laccase enzyme is derived from Rhizoctonia, Coprinus, Myceliophtera, Polyporous, Coriolus, or Phlebia.

3. The dough composition of claim 1, wherein the composition further comprise an enzyme selected from the group consisting of cellulase, a hemicellulase, a pentosanase, a glucose oxidase, a lipase, a peroxidase, a protease, a peptidase or an amylase.

4. The dough composition of claim 1, wherein the laccase enzyme is added in amount of from 5 to 100,000 Laccase Units per kg of flour.

5. The dough composition of claim 1, wherein the laccase enzyme is added in amount of from 50 to 30,000 Laccase Units per kg of flour.

6. The dough composition of claim 1, wherein the laccase enzyme is added in amount of from 50 to 20,000 Laccase Units per kg of flour.

7. The dough composition of claim 1, wherein the laccase enzyme is added in amount of from 100 to 1500 Laccase Units per kg of flour.

8. A method of preparing a dough composition, comprising adding to a dough composition a laccase enzyme in an amount effective to increase resistance of the dough composition to extension.

9. The method of claim 8, wherein the laccase enzyme is derived from Rhizoctonia, Coprinus, Myceliophtera, Polyporous, Coriolus, or Phlebia.

10. The method of claim 8, further comprising adding to the dough composition an enzyme selected from the group consisting of cellulase, a hemicellulase, a pentosanase, a glucose oxidase, a lipase, a peroxidase, a protease, a peptidase or an amylase.

11. The method of claim 8, wherein the laccase enzyme is added in amount of from 5 to 100,000 Laccase Units per kg of flour.

12. The method of claim 8, wherein the laccase enzyme is added in amount of from 50 to 30,000 Laccase Units per kg of flour.

13. The method of claim 8, wherein the laccase enzyme is added in amount of from 50 to 20,000 Laccase Units per kg of flour.

14. The method of claim 8, wherein the laccase enzyme is added in amount of from 100–1500 Laccase Units per kg of flour.

15. A method of preparing a bread, comprising:
   a) providing a dough composition;
   b) adding to the dough composition a laccase enzyme in an amount effective to increase resistance of the dough composition to extension; and
   c) baking the dough composition.

* * * * *